(12) United States Patent
Popovich et al.

(10) Patent No.: US 11,169,314 B2
(45) Date of Patent: Nov. 9, 2021

(54) WAVEGUIDE DEVICE INCORPORATING A LIGHT PIPE

(71) Applicant: DigiLens Inc., Sunnyvale, CA (US)

(72) Inventors: Milan Momcilo Popovich, Leicester (GB); Jonathan David Waldern, Los Altos Hills, CA (US); Alastair John Grant, San Jose, CA (US)

(73) Assignee: DigiLens Inc., Sunnyvale, CA (US)

( * ) Notice: Subject to any disclaimer, the term of this patent is extended or adjusted under 35 U.S.C. 154(b) by 0 days.

(21) Appl. No.: 16/664,665

(22) Filed: Oct. 25, 2019

(65) Prior Publication Data

US 2020/0096692 A1 Mar. 26, 2020

Related U.S. Application Data

(63) Continuation of application No. 15/558,409, filed as application No. PCT/GB2016/000051 on Mar. 15, 2016, now Pat. No. 10,459,145.

(60) Provisional application No. 62/177,494, filed on Mar. 16, 2015.

(51) Int. Cl.
*G02B 6/28* (2006.01)
*G02B 6/00* (2006.01)
*F21V 8/00* (2006.01)
*G02B 27/01* (2006.01)
*G02F 1/1334* (2006.01)

(52) U.S. Cl.
CPC ......... *G02B 6/0028* (2013.01); *G02B 6/0016* (2013.01); *G02B 6/0026* (2013.01); *G02B 6/0031* (2013.01); *G02B 6/0035* (2013.01); *G02B 27/0101* (2013.01); *G02B 27/0103* (2013.01); *G02F 1/13342* (2013.01); *G02B 2027/0125* (2013.01); *G02F 2201/307* (2013.01)

(58) Field of Classification Search
CPC ....... G02B 6/00; G02B 6/0028; G02B 6/0016
USPC .......................................................... 385/37
See application file for complete search history.

(56) References Cited

U.S. PATENT DOCUMENTS

| | | | | |
|---|---|---|---|---|
| 4,946,245 A | * | 8/1990 | Chamberlin | G02B 6/02085 385/37 |
| 5,138,687 A | * | 8/1992 | Horie | G02B 6/12002 385/129 |
| 5,631,885 A | * | 5/1997 | Brazas, Jr. | G11B 7/0901 369/112.12 |
| 5,751,452 A | * | 5/1998 | Tanaka | G02F 1/13342 349/1 |
| 5,832,156 A | * | 11/1998 | Strasser | G01J 3/1895 385/48 |
| 5,942,157 A | * | 8/1999 | Sutherland | C09K 19/544 252/582 |
| 6,008,675 A | | 12/1999 | Handa | |

(Continued)

FOREIGN PATENT DOCUMENTS

CN 101103297 A 1/2008
EP 1413972 A1 4/2004
(Continued)

*Primary Examiner* — Kaveh C Kianni
(74) *Attorney, Agent, or Firm* — KPPB LLP

(57) ABSTRACT

A waveguide apparatus has in combination: a light pipe with an optical axis for guiding light therethrough; a light coupling element in optical contact with an elongate portion of the reflecting surface of the light guide; and an optical waveguide in optical contact with the coupling element.

17 Claims, 7 Drawing Sheets

(56) References Cited

U.S. PATENT DOCUMENTS

| | | | |
|---|---|---|---|
| 6,545,808 B1* | 4/2003 | Ehbets | G02B 5/1857 359/15 |
| 6,850,656 B1* | 2/2005 | Bevilacqua | G01N 21/49 356/12 |
| 7,186,567 B1* | 3/2007 | Sutherland | G01N 21/774 252/299.01 |
| 7,229,692 B2* | 6/2007 | Melechko | B01D 67/0062 428/131 |
| 7,336,859 B2* | 2/2008 | Sanders | G01N 21/552 385/12 |
| 7,419,601 B2* | 9/2008 | Cooper | A61L 2/0082 210/679 |
| 7,553,371 B2* | 6/2009 | Dubrow | D06M 11/45 117/90 |
| 7,579,077 B2* | 8/2009 | Dubrow | B01J 20/28007 424/422 |
| 7,848,607 B2* | 12/2010 | Monro | C03B 37/01205 385/123 |
| 7,907,342 B2* | 3/2011 | Simmonds | G03B 21/10 359/630 |
| 7,940,351 B2* | 5/2011 | Nagayoshi | G02F 1/133611 349/64 |
| 8,233,204 B1* | 7/2012 | Robbins | G02B 26/0808 359/15 |
| 8,718,111 B1* | 5/2014 | Zhu | H01S 5/1032 372/50.11 |
| 9,372,347 B1* | 6/2016 | Levola | G02B 27/0081 |
| 9,429,692 B1* | 8/2016 | Saarikko | G02B 5/1866 |
| 9,513,480 B2 | 12/2016 | Saarikko et al. | |
| 9,535,253 B2 | 1/2017 | Levola et al. | |
| 9,715,110 B1* | 7/2017 | Brown | G02B 27/0081 |
| 10,088,675 B1 | 10/2018 | Brown et al. | |
| 10,156,725 B2* | 12/2018 | TeKolste | G02B 6/0026 |
| 10,216,061 B2* | 2/2019 | Popovich | G02B 26/0808 |
| 10,459,145 B2 | 10/2019 | Popovich et al. | |
| 2005/0260120 A1* | 11/2005 | Smalley | B01J 19/10 423/447.1 |
| 2011/0063604 A1* | 3/2011 | Hamre | G06K 9/0004 356/71 |
| 2012/0027347 A1 | 2/2012 | Mathai et al. | |
| 2013/0250207 A1* | 9/2013 | Bohn | G02F 1/133524 349/61 |
| 2013/0271731 A1* | 10/2013 | Popovich | G02B 6/02076 353/31 |
| 2013/0312811 A1 | 11/2013 | Aspnes et al. | |
| 2014/0043689 A1 | 2/2014 | Mason | |
| 2014/0104665 A1* | 4/2014 | Popovich | G02B 27/0103 359/15 |
| 2014/0140653 A1* | 5/2014 | Brown | G02B 27/0172 385/10 |
| 2014/0140654 A1* | 5/2014 | Brown | G02B 27/0172 385/10 |
| 2014/0230897 A1 | 8/2014 | Waldman et al. | |
| 2015/0063745 A1* | 3/2015 | Lin | H01S 5/026 385/14 |
| 2015/0086163 A1* | 3/2015 | Valera | G02B 6/34 385/37 |
| 2015/0117808 A1* | 4/2015 | Chen | G02B 6/29328 385/2 |
| 2016/0003997 A1 | 1/2016 | Ouderkirk | |
| 2016/0231257 A1* | 8/2016 | Kostamo | G01N 21/8851 |
| 2016/0231478 A1* | 8/2016 | Kostamo | A61K 51/0491 |
| 2016/0231566 A1* | 8/2016 | Levola | G02B 27/0081 |
| 2016/0231567 A1* | 8/2016 | Saarikko | G02B 5/1866 |
| 2016/0231568 A1* | 8/2016 | Saarikko | G02B 27/0172 |
| 2016/0231569 A1* | 8/2016 | Levola | G02F 1/125 |
| 2016/0231570 A1* | 8/2016 | Levola | G02B 6/0035 |
| 2016/0234485 A1* | 8/2016 | Robbins | G02B 27/0172 |
| 2016/0238772 A1* | 8/2016 | Waldern | G02B 6/124 |
| 2016/0327705 A1* | 11/2016 | Simmonds | B29D 11/00663 |
| 2017/0131551 A1 | 5/2017 | Robbins et al. | |
| 2017/0207600 A1* | 7/2017 | Klamkin | G02B 6/12002 |
| 2017/0235219 A1* | 8/2017 | Kostamo | B29D 11/00951 264/40.1 |
| 2018/0003805 A1* | 1/2018 | Popovich | G02B 26/106 |
| 2018/0011324 A1* | 1/2018 | Popovich | G02B 27/0172 |
| 2018/0031752 A1* | 2/2018 | Ferrini | G02B 6/0036 |
| 2018/0059305 A1 | 3/2018 | Popovich et al. | |
| 2018/0088325 A1* | 3/2018 | Brown | G02B 17/0852 |
| 2018/0232048 A1* | 8/2018 | Popovich | G02F 1/2955 |
| 2018/0246354 A1* | 8/2018 | Popovich | G02F 1/1334 |
| 2020/0333606 A1* | 10/2020 | Popovich | G02B 27/0093 |

FOREIGN PATENT DOCUMENTS

| | | |
|---|---|---|
| EP | 1526709 A2 | 4/2005 |
| EP | 1748305 A1 | 1/2007 |
| JP | 2003066428 A | 3/2003 |
| JP | 2003270419 A | 9/2003 |
| JP | 2008112187 A | 5/2008 |
| TW | 200535633 A | 11/2005 |
| TW | 200801583 A | 1/2008 |
| WO | 2003081320 A1 | 10/2003 |
| WO | 2005001753 A1 | 1/2005 |
| WO | 2005006065 A8 | 1/2005 |
| WO | 2005006065 A3 | 2/2005 |
| WO | 2005073798 A1 | 8/2005 |
| WO | 2006064301 A1 | 6/2006 |
| WO | 2006064325 A1 | 6/2006 |
| WO | 2006064334 A1 | 6/2006 |
| WO | 2006102073 A2 | 9/2006 |
| WO | 2006132614 A1 | 12/2006 |
| WO | 2006102073 A3 | 1/2007 |
| WO | 2007015141 A2 | 2/2007 |
| WO | 2007029032 A1 | 3/2007 |
| WO | 2007085682 A1 | 8/2007 |
| WO | 2007141587 A1 | 12/2007 |
| WO | 2007141589 A1 | 12/2007 |
| WO | 2008011066 A2 | 1/2008 |
| WO | 2008011066 A9 | 5/2008 |
| WO | 2008100545 A2 | 8/2008 |
| WO | 2008011066 A3 | 12/2008 |
| WO | 2010078856 A1 | 7/2010 |
| WO | 2016181108 A1 | 11/2016 |
| WO | 2017182771 A1 | 10/2017 |
| WO | 2017203200 A1 | 11/2017 |
| WO | 2017203201 A1 | 11/2017 |
| WO | 2017207987 A1 | 12/2017 |
| WO | 2018096359 A3 | 7/2018 |
| WO | 2018150163 A1 | 8/2018 |
| WO | 2019077307 A1 | 4/2019 |
| WO | 2019122806 A1 | 6/2019 |
| WO | 2019171038 A1 | 9/2019 |
| WO | 2020212682 A1 | 10/2020 |
| WO | 2021032982 A1 | 2/2021 |
| WO | 2021032983 A1 | 2/2021 |
| WO | 2021044121 A1 | 3/2021 |

* cited by examiner

FIG.3A
FIG.3B
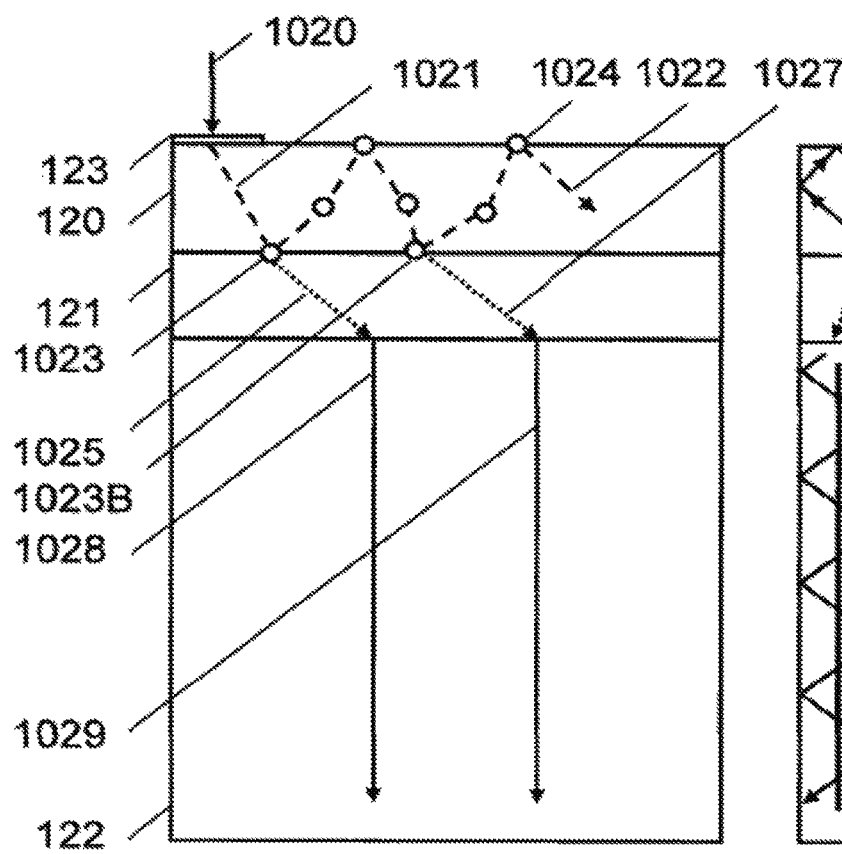
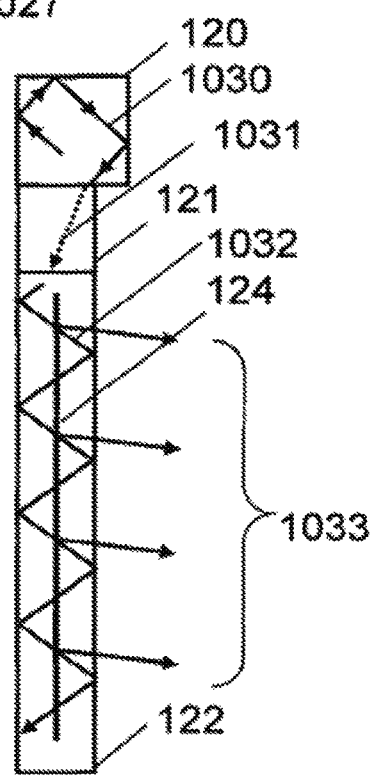
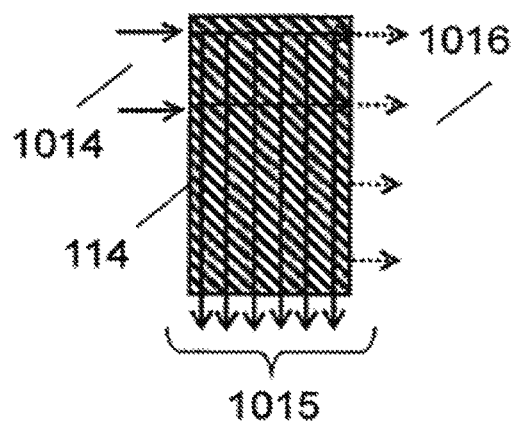
FIG.3C

FIG.7A
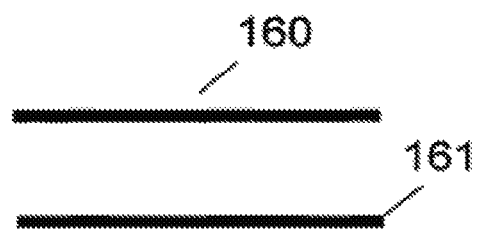
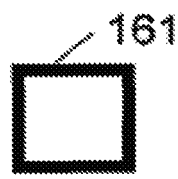
FIG.7B
FIG.8A
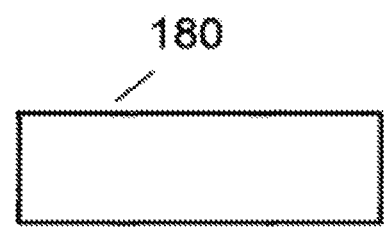
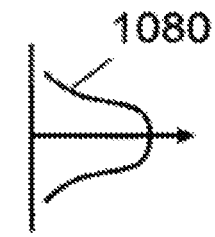
FIG.8B
FIG.9A
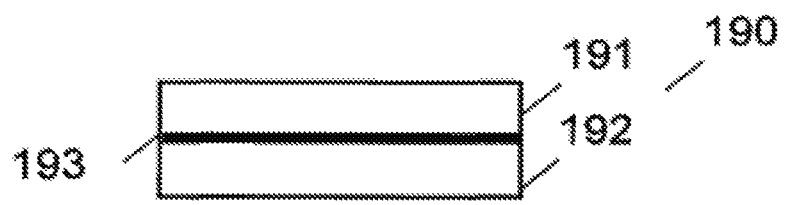
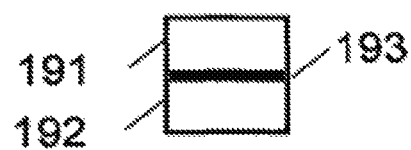
FIG.9B

WAVEGUIDE DEVICE INCORPORATING A LIGHT PIPE

CROSS REFERENCE TO RELATED APPLICATIONS

This application is a continuation of U.S. patent application Ser. No. 15/558,409, entitled WAVEGUIDE DEVICE INCORPORATING A LIGHT PIPE to Popovich et al., filed Sep. 14, 2017, which is a U.S. National Phase of PCT Application No. PCT/GB2016/000051, entitled WAVEGUIDE DEVICE INCORPORATING A LIGHT PIPE to Popovich et al., filed Mar. 15, 2016, which claims priority to U.S. Provisional Application No. 62/177,4945, entitled WAVEGUIDE DEVICE INCORPORATING A LIGHT PIPE to Popovich et al., filed Mar. 16, 2015, the disclosures of which are incorporated herein by reference in the entireties.

BACKGROUND OF THE INVENTION

This invention relates to a waveguide device, and more particularly to a waveguide holographic grating device incorporating a light pipe. Waveguide optics is currently being considered for a range of display and sensor applications for which the ability of waveguides to integrate multiple optical functions into a thin, transparent, lightweight substrate is of key importance. This new approach is stimulating new product developments including near-eye displays for Augmented Reality (AR) and Virtual Reality (VR), compact Heads Up Display (HUDs) for aviation and road transport and sensors for biometric and laser radar (LIDAR) applications. A common requirement in waveguide optics is to provide beam expansion in two orthogonal directions. In display applications this translates to a large eyebox. While the principles of beam expansion in holographic waveguides are well established dual axis expansion requires separate grating layers to provide separate vertical and horizontal expansion. One of the gratings usually the one giving the second axis expansion also provides the near eye component of the display where the high transparency and thin, lightweight form factor of a diffractive optics can be used to maximum effect. In practical display applications, which demand full color and large fields of view the number of layers required to implement dual axis expansion becomes unacceptably large resulting in increased thickness weight and haze. Solutions for reducing the number of layers based on multiplexing two or more gratings in a single layer or fold gratings which can perform dual axis expansion (for a given angular range and wavelength) in a single layer are currently in development. Dual axis expansion is also an issue in waveguides for sensor applications such as eye trackers and LIDAR. There is a requirement for a low cost, efficient means of generating the first axis expansion in a dual axis expansion waveguide.

SUMMARY OF THE INVENTION

It is a first object of the invention to provide a low cost, efficient means of generating the first axis expansion in a dual axis expansion waveguide.

The object of the invention is achieved in first embodiment of the invention in which there is provided a waveguide apparatus comprising in combination: a light pipe with an optical axis for guiding light therethrough; a light coupling element in optical contact with an elongate portion of the reflecting surface of the light guide; and an optical waveguide in optical contact with the light coupling element.

In one embodiment the light is transmitted from the light pipe to the optical waveguide via the light coupling element.

In one embodiment the light is transmitted from the optical waveguide to the light pipe via the light coupling element.

In one embodiment the reflecting surface comprises abutting mutually inclined elongate elements. At least one elongate element is in optical contact with the light coupling element.

In one embodiment the reflecting surface comprises abutting elongate elements mutually inclined at a common angle. At least one of the elongate elements is in optical contact with the light coupling element.

In one embodiment the coupling element is one of a grating, a beam splitter, an evanescent coupling optical medium, or a gradient index optical medium.

In one embodiment the light coupling element is a fold grating.

In one embodiment the light coupling element is a surface relief grating.

In one embodiment the light coupling element couples light characterized by at least one of angular range, wavelength range or polarization state.

In one embodiment the light coupling element is a Bragg grating, a switchable Bragg grating or an array of selectively switchable elements. The coupling element is recorded in one of a HPDLC grating, uniform modulation grating or reverse mode HPDLC grating.

In one embodiment the light coupling element is a grating comprising at least two multiplexed gratings.

In one embodiment the light coupling element is a grating having at least one of the characteristics of spatially varying thickness, spatially-varying diffraction efficiency, or spatially-varying k-vector directions.

In one embodiment the optical medium of the light pipe is at least one of air, optical refractive material or a gradient index material.

In one embodiment the optical waveguide contains a grating operative to extract light propagating therethrough out of the optical waveguide or a grating operative to couple-in light from outside the optical waveguide.

In one embodiment the light guide device further comprises a coupling grating in optical contact with the light pipe. The coupling grating has a non zero clock angle with respect to the optical axis.

In one embodiment the light guide device further comprises a light pipe coupling grating in optical contact with the light pipe. The optical waveguide contains a grating having a reciprocal diffractive relationship with the light pipe coupling grating.

In one embodiment the light guide device further comprises a light pipe coupling grating in optical contact with the light pipe. The the light pipe coupling grating couples light modulated with temporally-varying angularly-distributed information content into the light pipe.

In one embodiment the light guide device further comprises a light pipe coupling grating in optical contact with the light pipe. The coupling grating couples data modulated light out of the light pipe.

In one embodiment the light pipe is divided into two elongate portions by a beamsplitter layer.

In one embodiment the light pipe is curved.

A more complete understanding of the invention can be obtained by considering the following detailed description in conjunction with the accompanying drawings, wherein like index numerals indicate like parts. For purposes of clarity, details relating to technical material that is known in the technical fields related to the invention have not been described in detail.

BRIEF DESCRIPTION OF THE DRAWINGS

FIG. 3A is a plan view of a waveguide apparatus in one embodiment.

FIG. 3B is a side elevation view of the embodiment of FIG. 3A.

FIG. 3C is a plan view of a basic fold grating.

FIG. 7A is a side elevation view of a hollow cavity square cross-section light pipe in one embodiment.

FIG. 7B is a cross section view of a hollow cavity square cross-section light pipe in one embodiment.

FIG. 8A is a side elevation view of a gradient index square cross-section light pipe in one embodiment.

FIG. 8B is a plot of the lateral refractive index distribution of a gradient index square cross-section light pipe in one embodiment.

FIG. 9A is a side elevation view of a light pipe square cross-section including a beamsplitter layer in one embodiment.

FIG. 9B is a cross section view of a light pipe square cross-section including a beamsplitter layer in one embodiment.

DETAILED DESCRIPTION OF THE INVENTION

Figure 1:
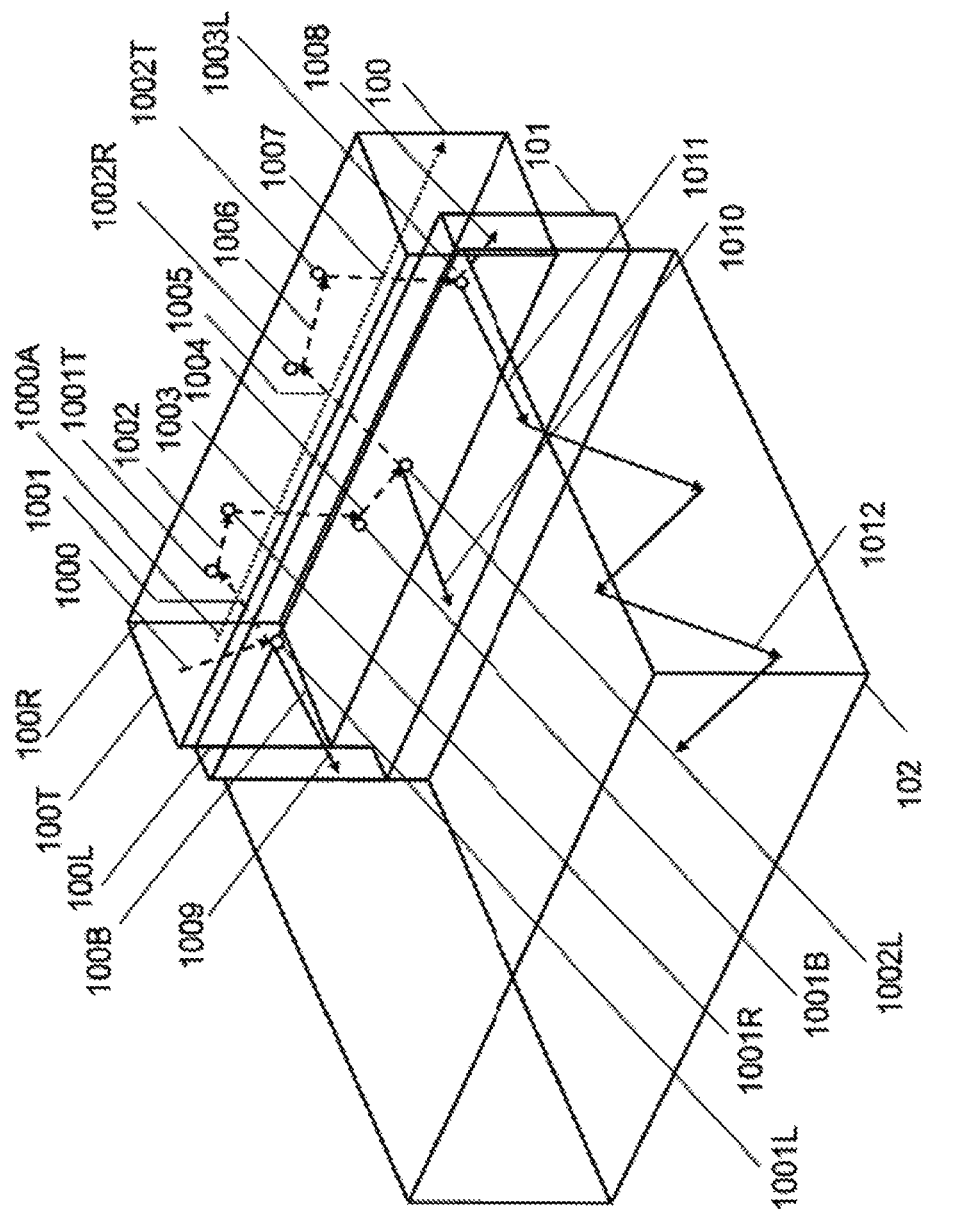
FIG. 1 is a schematic three dimensional illustration of a waveguide apparatus in one embodiment.

The invention will now be further described by way of example only with reference to the accompanying drawings. It will apparent to those skilled in the art that the present invention may be practiced with some or all of the present invention as disclosed in the following description. For the purposes of explaining the invention well-known features of optical technology known to those skilled in the art of optical design and visual displays have been omitted or simplified in order not to obscure the basic principles of the invention. Unless otherwise stated the term "on-axis" in relation to a ray or a beam direction refers to propagation parallel to an axis normal to the surfaces of the optical components described in relation to the invention. In the following description the terms light, ray, beam and direction may be used interchangeably and in association with each other to indicate the direction of propagation of light energy along rectilinear trajectories. Parts of the following description will be presented using terminology commonly employed by those skilled in the art of optical design. It should also be noted that in the following description of the invention repeated usage of the phrase "in one embodiment" does not necessarily refer to the same embodiment.

The grating used in the invention is desirably a Bragg grating (also referred to as a volume grating). Bragg gratings have high efficiency with little light being diffracted into higher orders. The relative amount of light in the diffracted and zero order can be varied by controlling ther refractive index modulation of the grating, a property which is used to make lossy waveguide gratings for extracting light over a large pupil. One important class of gratings is known as Switchable Bragg Gratings (SBG). SBGs are fabricated by first placing a thin film of a mixture of photopolymerizable monomers and liquid crystal material between parallel glass plates. One or both glass plates support electrodes, typically transparent indium tin oxide films, for applying an electric field across the film. A volume phase grating is then recorded by illuminating the liquid material (often referred to as the syrup) with two mutually coherent laser beams, which interfere to form a slanted fringe grating structure. During the recording process, the monomers polymerize and the mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the film. When an electric field is applied to the grating via transparent electrodes, the natural orientation of the LC droplets is changed causing the refractive index modulation of the fringes to reduce and the hologram diffraction efficiency to drop to very low levels. Typically, SBG Elements are switched clear in 30 µs. With a longer relaxation time to switch ON. Note that the diffraction efficiency of the device can be adjusted, by means of the applied voltage, over a continuous range. The device exhibits near 100% efficiency with no voltage applied and essentially zero efficiency with a sufficiently high voltage applied. In certain types of HPDLC devices magnetic fields may be used to control the LC orientation. In certain types of HPDLC phase separation of the LC material from the polymer may be accomplished to such a degree that no discernible droplet structure results. A SBG may also be used as a passive grating. In this mode its chief benefit is a uniquely high refractive index modulation.

SBGs may be used to provide transmission or reflection gratings for free space applications. SBGs may be implemented as waveguide devices in which the HPDLC forms either the waveguide core or an evanescently coupled layer in proximity to the waveguide. The parallel glass plates used to form the HPDLC cell provide a total internal reflection (TIR) light guiding structure. Light is coupled out of the SBG when the switchable grating diffracts the light at an angle beyond the TIR condition. Waveguides are currently of interest in a range of display and sensor applications. Although much of the earlier work on HPDLC has been directed at reflection holograms transmission devices are proving to be much more versatile as optical system building blocks. Typically, the HPDLC used in SBGs comprise liquid crystal (LC), monomers, photoinitiator dyes, and coinitiators. The mixture frequently includes a surfactant. The patent and scientific literature contains many examples of material systems and processes that may be used to fabricate SBGs. Two fundamental patents are: U.S. Pat. No. 5,942,157 by Sutherland, and U.S. Pat. No. 5,751,452 by Tanaka at al. Both filings describe monomer and liquid crystal material combinations suitable for fabricating SBG devices. One of the known attributes of transmission SBGs is that the LC molecules tend to align normal to the grating fringe planes. The effect of the LC molecule alignment is that transmission SBGs efficiently diffract P polarized light (ie light with the polarization vector in the plane of incidence) but have nearly zero diffraction efficiency for S polarized light (ie light with the polarization vector normal to the plane of incidence. Transmission SBGs may not be used at near-grazing incidence as the diffraction efficiency of any grating for P polarization falls to zero when the included angle between the incident and reflected light is small.

The object of the invention is achieved in first embodiment illustrated in FIG. 1 in which there is provided a waveguide apparatus comprising a light pipe 100 with an optical axis 1000A; a light coupling element 101 in optical contact with an elongate portion of the reflecting surface of the light guide; and an optical waveguide 102 in optical contact with the coupling element. In most embodiments the optical axis is an axis of symmetry (corresponding to the intersections of the normals to the reflecting surfaces the light pipe). The light pipe is square in cross section and has elongate reflecting surfaces. 100L, 100R, 100T, 100B where characters L,R,T,B refer to the left, right, top and bottom surfaces of the light pipe respectively One TIR ray path in the light pipes is represented by the rays 1000-1008. The ray follows a cyclic or spiral path down the light pipe. The means for producing the spiral path will be discussed later. The interactions of the rays with the light pipe surface are indicated by the points labelled 1001L 1001T,1001R, 1001B, to 1002L 1002T,1002R, 1002B, 1003L. The surface 100L is in optical contact with the light coupling element such that rays striking the points 1001L,1002,1003L are coupled into the optical waveguide as indicated by the rays 1009-1011. Note that in FIG. 1 light is shown being transmitted from the light pipe to the optical waveguide via the light coupling element. In other embodiments the light is transmitted from the optical waveguide to the light pipe via the light coupling element. Such embodiments are described by FIG. 1 with the ray arrows are reversed. In one embodiment the light pipe is curved.

Figure 2A:
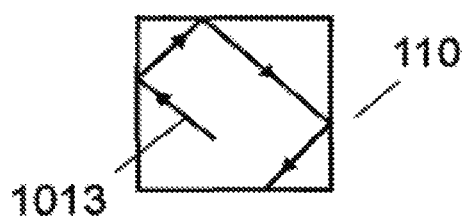
FIG. 2A is a cross section view of a light pipe of a light pipe with a square cross-section.
Figure 2B:
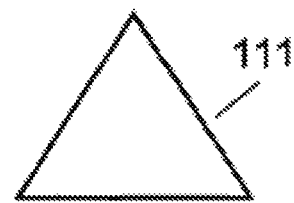
FIG. 2B is a cross section view of a light pipe of a light pipe with a triangular cross-section.
Figure 2C:
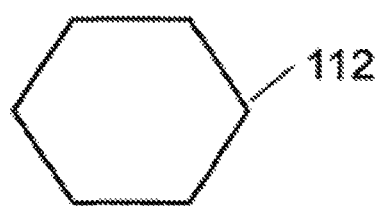
FIG. 2C is a cross section view of a light pipe of a light pipe with a hexagonal cross-section.
Figure 2D:
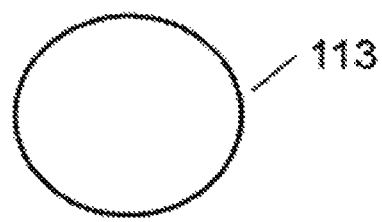
FIG. 2D is a cross section view of a light pipe of a light pipe with a round cross-section.

For simplicity of explanation we shall continue to consider light pipes of square cross section. However, the invention may be used with light pipes of more generalized cross section such as the examples shown in FIG. 2. In one group of embodiments the reflecting surface comprises abutting mutually inclined elongate planar elements with at least one elongate element in optical contact with the coupling element. FIG. 2A shows s typical spiral ray path projection 1013 for the embodiment of FIG. 1. The light pipes may also have regular polygonal cross sections such as the triangular one shown in FIG. 2B and the hexagonal cross section shown in FIG. 2C. In one embodiment the cross section may be circular as sown in FIG. 2D. In other embodiments the light pipe may have a reflective surface built up from elongate elements of higher order curvatures. In most practical application it will be advantages for the elongated surface elements to be equidistant from the optical axis of the light pipe. In other words the abutting elongate elements would be mutually inclined at a common angle with at least one the elongate element in optical contact with the coupling element.

The coupling element may be based on a grating or beam splitter. In one embodiment the coupling element may be a gradient index optical medium. In another embodiment the coupling element may be an evanescent coupling optical medium. There are several options for implement a coupling element based on a grating. In one embodiment the coupling element is a surface relief grating. A Bragg grating offers greater angle and wavelength selectivity. In one embodiment a switchable Bragg grating recorded in HPDLC, as discussed above may be used. The same technology may be used to provide an array of selectively switchable elements disposed along the length of the light pipe. In one embodiment the coupling element is based on a grating recorded in a uniform modulation grating. Exemplary uniform modulation liquid crystal-polymer material systems are disclosed in United State Patent Application Publication No.: US2007/0019152 by Caputo et al and PCT Application No.: PCT/EP2005/006950 by Stumpe et al. both of which are incorporated herein by reference in their entireties. Uniform modulation gratings are characterized by high refractive index modulation (and hence high diffraction efficiency) and low scatter. In one embodiment the coupling element is based on a grating recorded in a a reverse mode HPDLC material. Reverse mode HPDLC differs from conventional HPDLC in that the grating is passive when no electric field is applied and becomes diffractive in the presence of an electric field. The reverse mode HPDLC may be based on any of the recipes and processes disclosed in PCT Application No.: PCT/GB2012/000680, entitled IMPROVEMENTS TO HOLOGRAPHIC POLYMER DISPERSED LIQUID CRYSTAL MATERIALS AND DEVICES. The grating may be recorded in any of the of the above material systems but used in a passive (non-switching) mode. The fabrication process is identical to that used for switched but with the electrode coating stage being omitted. LC polymer material systems are highly desirable in view of their high index modulation.

In one embodiment shown in FIG. 3 the waveguide apparatus comprises a light pipe 120, a light coupling element 121 comprising a fold grating and an optical waveguide 122. The components are shown in plan view in FIG. 3A and in cross section in FIG. 3B. Input light 1020 is coupled into the light pipe by the grating 123 and follows a spiral path indicated in projection by the rays 1021-1022 in FIG. 3A and 1030 in FIG. 3B. Rays intersecting the light pipe face that is in optical contact with the optical coupling element, for example the rays at interaction points 1023A, 1023B, are coupled in the waveguide device. The coupling light paths are illustrated schematically by the rays 1023A, 1023B in FIG. 3A and 1031 in FIG. 3B. The waveguide device contains an extraction grating 124 which diffracts a portion of the guided beam out of the waveguide at each beam-grating interaction along the TIR path 1032 (FIG. 3B). The paths in the waveguide device are also indicated by the rays 1028,1029 in FIG. 3A. The light extracted from the optical waveguide is indicated by 1033. In a display application this light would be directed to the eyebox. The coupling element is a fold grating. This type of grating is normally used for changing beam direction and providing beam expansion within a waveguide. Gratings designed for coupling light into or out of a waveguides are tilted around an axis lying in the waveguide plane. Fold gratings have a more generalized tilt. In their simplest implementation, as used in the present invention, they are tilted around an axis perpendicular to the waveguide plane such they deflect beams in the waveguide plane. More generally, they may have tilts defined by two rotation angles so that, for example, light can be coupled into the waveguide and deflected into an orthogonal direction inside the waveguide, all in one step. FIG. 3C is a plan view of a basic fold grating 114. When the set of rays 1014 encounter the grating, they diffract in a manner that changes the direction of propagation by 90°. Unlike a conventional vertical extraction grating, the light does not leave the waveguide. Note that when a ray encounters the grating, regardless of whether it intersects the grating from above or below, a fraction of it changes direction and the remainder continues unimpeded. A typical ray will interact many times with vertically (in the Y direction) while some light will be moving laterally (in the X direction). From a design perspective, it is desirable to engineer the amount of light 1015 emerging from the output edge of the grating to be uniformly distributed laterally and the amount of light 1016 emerging from the side edge of the grating to be as small as possible.

In one embodiment the coupling element couples light characterized by at least one of angular range, wavelength range or polarization state. Bragg transmission gratings are characterized by a high degree of angular selectivity. The coupling element may also be based on a beamsplitter design to operate over a defined angular or wavelength range. In one embodiment the coupling elements is based on a birefringent grating. The index of such gratings has two components: extraordinary ($n_e$) and ordinary ($n_o$) indices. The extraordinary index is defined by the optic axis (ie axis of symmetry) of a uniaxial crystal as determined by the average LC director direction. The ordinary index corresponds to the other two orthogonal axes. More generally the index is characterised using a permittivity tensor. To the best of the inventors' knowledge the optic axis in LC-based gratings tends to align normal to the Bragg fringes ie along the K-vectors. For reasonably small grating slant angles applying an electric field across the cell re-orients the directors normal to the waveguide faces, effectively clearing the grating. An incident ray sees an effective index dependent on both the extraordinary and ordinary indices with the result that the Poynting vector and wave vector are separated by a small angle. This effect becomes more pronounced at higher angles. In one embodiment the diffracted rays have a polarization state produced by aligning the average relative permittivity tensor of the grating. It is also useful in some applications to have the capability of controlling the polarization of non-diffracted light. Accordingly, in one embodiment the non-diffracted rays have a polarization state produced by aligning the average relative permittivity tensor of the grating. The polarization states may be one of randomly, linearly or elliptically polarized. In applications where the diffracted light interacts with another grating is desirable that it is linearly polarized. For example, SBGs have highest diffraction efficiency for P-polarized light. In a waveguide the birefringence of the LC will tend to rotate the polarization of the light at each TIR bounce. This has the effect of scrambling the polarization of the light. Initial experiments point to the light not becoming fully randomly polarized. However, this is likely to depend on the characteristics of the birefringence. In one embodiment the permittivity tensor is modified to provide a random polarization state at the output end of the grating. Random polarization is desirable in applications in which the diffracted light is viewed directly, for example in a display.

Figure 4:
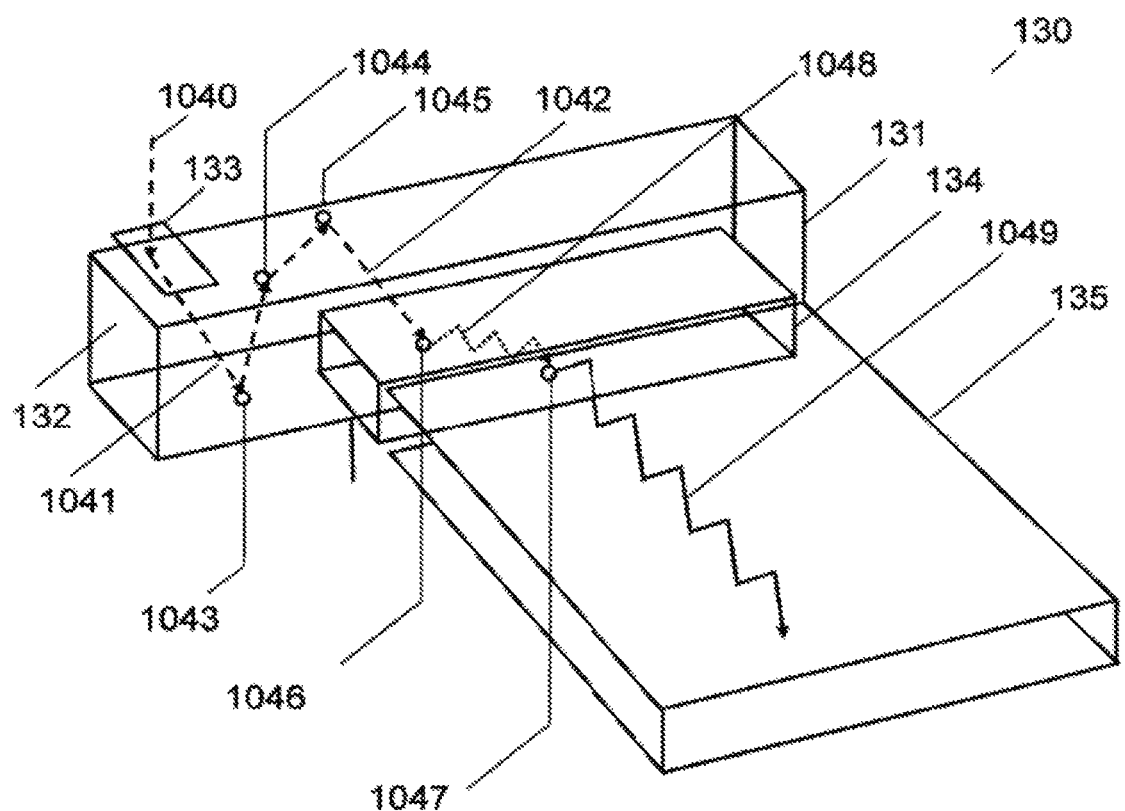
FIG. 4 is a schematic three dimensional illustration of a waveguide apparatus using a fold grating light coupling element in one embodiment.

In one embodiment shown in FIG. 4 the waveguide apparatus comprises the light pipe 131, which has a square cross section 132, a coupling grating 133, a light coupling element 134 and an optical waveguide 135. A prism may be used as an alternative to the coupling grating in some embodiments. Input light 1040 is coupled into the light pipe by the coupling grating and follows a spiral path indicated by the rays 1041-1042. The rays intersecting the faces of the light pipe nearest ht light coupling element such as the ray intersecting the point 1046 are coupled in the waveguide device by the light coupling element. In the embodiment of FIG. 4 the light couple is a fold grating. The guide light path through the fold grating is indicated by the rays 1048. The rays 1048 are then coupled in to the optical waveguide at the point 1047 to provide the guided light path 1049.

Figure 5:
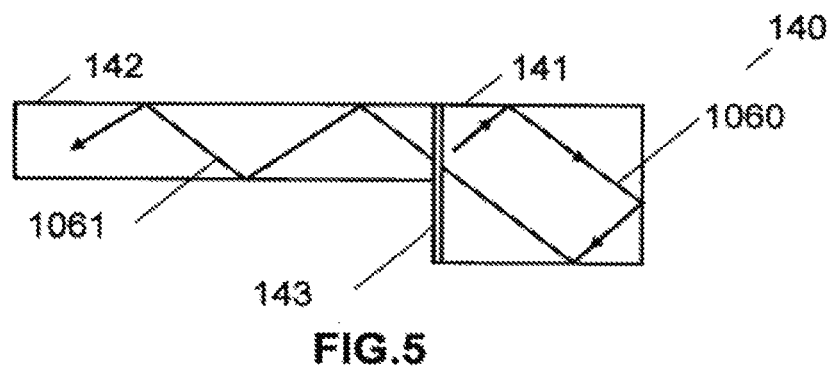
FIG. 5 is a detail of a waveguide apparatus using a beamsplitter light coupling element in one embodiment.

In one embodiment the light coupling element may be a beam splitter as shown in FIG. 5 which illustrates a detail of the apparatus comprising cross section of a light pipe 141, a light coupling elements 143 comprising a beam splitter layer and an optical waveguide 142. In one embodiment the beamsplitter is a thin metal coating with transmittance varying along the length of the light pipe.

Figure 6:
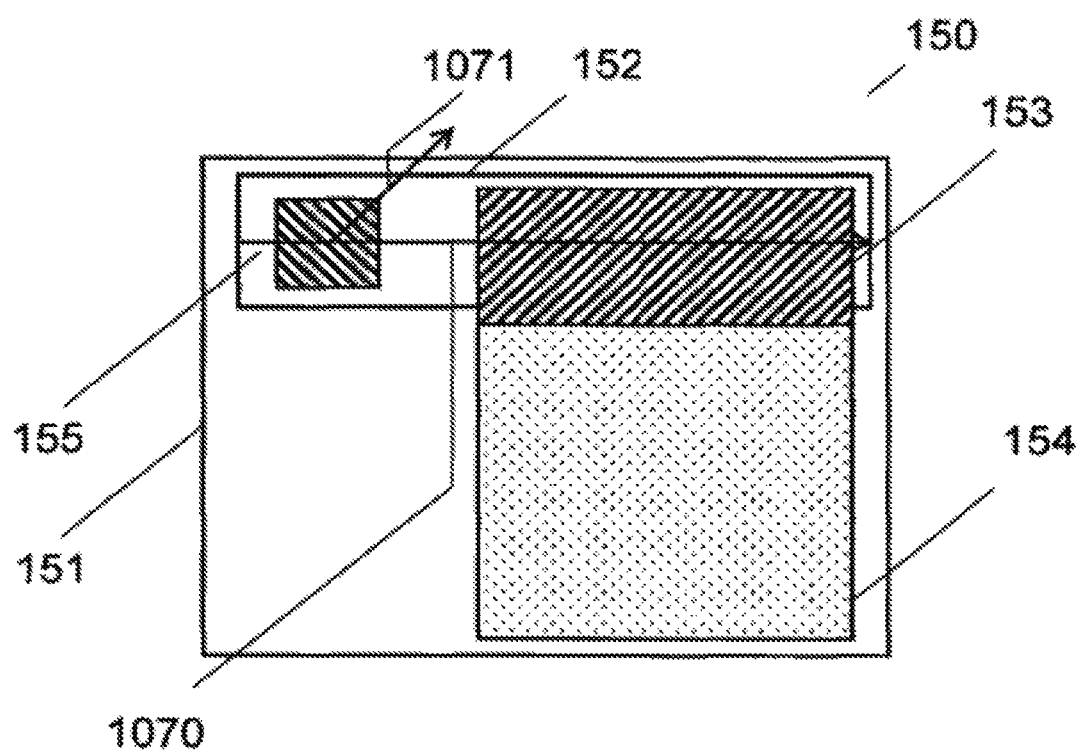
FIG. 6 is a plan view of a waveguide apparatus using a clocked coupling grating in one embodiment.

In one embodiment shown in FIG. 6 the apparatus 150 comprises an optical substrate onto which is mounted a light pipe 152, a light coupling element 152 and an optical waveguide 154 and a coupling grating 155. The grating comprises the grating elements 156. In one embodiment the coupling grating has a non zero clock angle with respect to the optical axis. In other words, the projection of the coupling grating k-vector 1071 in the plane of the substrate makes an angle with the light pipe optical axis 1070. The effect of the clock angle is to produce the spiral-like TIR path in the light pipe. This principle may be applied in all of the embodiments of the inventions. A similar effect may be produced by using a prismatic device. However, a clocked grating is the most elegant solution in terms of form factor. Typically, the clock angle will be around 45 degrees. Other angles may be used depending on the light pipe geometry and angular constraints imposed by the light coupling element. Advantageously, the optical waveguide contains a grating having a reciprocal diffractive relationship with the light pipe coupling grating.

The embodiments of FIGS may be used to provide the first axis of expansion in a two axis beams expansion waveguide display as disclosed in The two axis expansion essentially provides a large exit pupil or eye box. Using the present invention, the light pipe would provide the first axis of expansion and the optical waveguide the second (orthogonal) axis of expansion. Where a fold grating is used as the light coupling element care must be taken to make the spiraling light in the light pipe on-Bragg with the fold grating for particular ray vectors direction incident on the light pipe surface in optical contact with the light coupling element (that is, the fold grating). This is achieved by clocking the coupling grating at 45 degrees. Advantageously two coupling gratings are used for image injection into the light pipe in order achieve pupil coverage of all field angles at the fold grating. The fold grating then redirects the diffracted component the spiraling light into a TIR path in the optical waveguide.

In most applications of the invention the optical waveguide will contain a grating. Grating may be used to couple light out of the waveguide as discussed above. Such embodiments could be applied in waveguide displays such as the ones disclosed in U.S. patent application Ser. No. 13/844,456 entitled TRANSPARENT WAVEGUIDE DISPLAY. In such embodiment the coupling ling grating couples light modulated with temporally-varying angularly-distributed information content into the light pipe. The coupling grating may be used depending on the application. In another embodiment the grating will be used or to provide in coupling from external source. This principle may be applied in waveguide eye trackers such as the ones disclosed in PCT/GB2013/000210 entitled APPARATUS FOR EYE TRACKING.

In one embodiment the light coupling element is a grating comprising at least two multiplexed gratings. Each grating may operate over a defined angular or spectral range. Multiplexing allows the angular bandwidth and color space to be expanded without significantly increasing the number of waveguide layers. In one embodiment the light coupling element is a grating having at least one of the characteristics of spatially varying thickness, spatially-varying diffraction efficiency, or spatially-varying k-vector directions. In one embodiment the grating has a spatially varying thickness. Since diffraction efficiency is proportional to the grating thickness while angular bandwidth is inversely propagation to grating thickness allowing the uniformity of the diffracted light to be controlled. In one embodiment the grating has spatially-varying k-vector directions for controlling the efficiency, uniformity and angular range of the grating. In one embodiment grating has spatially-varying diffraction efficiency. The application of multiplexing, and spatial varying thickness, k-vector directions and diffraction efficiency in the present invention may be based on the embodiments, drawings and teachings provided in U.S. patent application Ser. No. 13/506,389 entitled COMPACT EDGE ILLUMINATED DIFFRACTIVE DISPLAY, U.S. Pat. No. 8,233,204 entitled OPTICAL DISPLAYS, PCT Application No.: US2006/043938, entitled METHOD AND APPARATUS FOR PROVIDING A TRANSPARENT DISPLAY, PCT Application No.: GB2012/000677 entitled WEARABLE DATA DISPLAY, U.S. patent application Ser. No. 13/317,468 entitled COMPACT EDGE ILLUMINATED EYEGLASS DISPLAY, U.S. patent application Ser. No. 13/869,866 entitled HOLOGRAPHIC WIDE ANGLE DISPLAY, and U.S. patent application Ser. No. 13/844,456 entitled TRANSPARENT WAVEGUIDE DISPLAY.

In one embodiment shown in FIG. 7 the light pipe comprises a hollow cavity 160 with a mirror coating applied the internal surfaces. The light pipe which has a square cross section is shown in side view in FIG. 7A and in cross section 161 in FIG. 7B. In one embodiment shown in FIG. 8 the light pipe is a refactive element 180 fabricated from a gradient index material. The light pipe is shown in side view in FIG. 9. The transverse refactive index distribution is shown in FIG. 9B.

In one embodiment shown in FIG. 9 the light pipe 190 is divided into two elongate portions 191,192 by a beamsplitter layer 193. In one embodiment the beamsplitter is a thin film coating. The light pipe is shown in side view in FIG. 9A and in cross-section in FIG. 9B. In-one embodiment the beamsplitter provides 50/50 beams division. In another embodiment the beamsplitter may be polarization selective.

Figure 10:
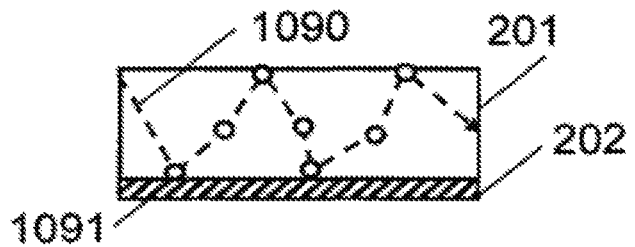
FIG. 10 is a side elevation view of a light pipe light coupling element based on a grating in one embodiment.
Figure 11:
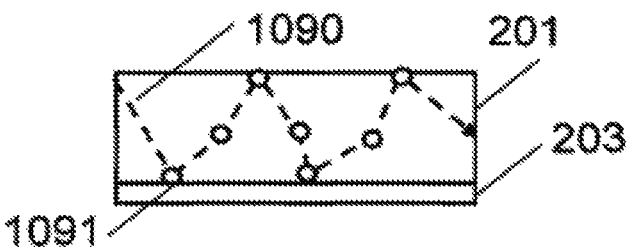
FIG. 11 is a side elevation view of a light pipe light coupling element based on a beamsplitter in one embodiment.
Figure 12:
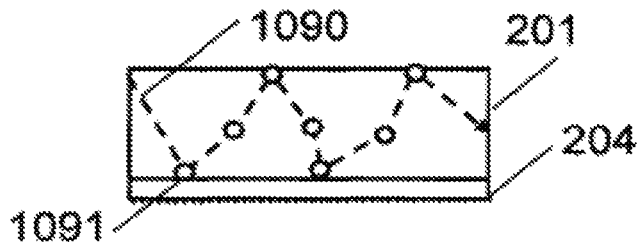
FIG. 12 is a side elevation view of a light pipe light coupling element based on a surface relief grating in one embodiment.
Figure 13:
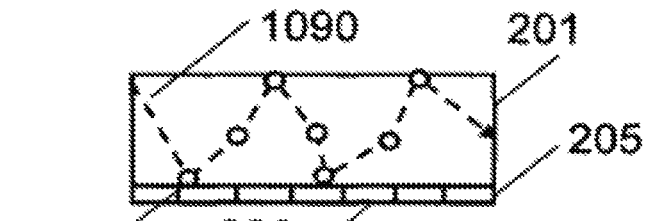
FIG. 13 is a side elevation view of a light pipe light coupling element based on a switchable grating array in one embodiment.
Figure 14:
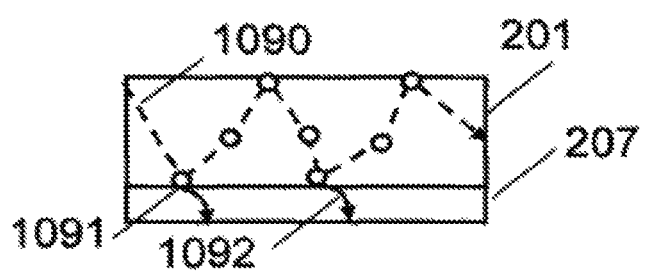
FIG. 14 is a side elevation view of a light pipe light coupling element based on a gradient index layer in one embodiment.

FIGS. 10-13 show schematic side elevation views of a light pipe and light coupling element combinations for use in the invention. In each case a short section 201 of a light pipe based on the square cross section elements discussed above, with a portion of the spiral light path 1090 and a ray interaction 1091 with the light coupling element is illustrated. In the embodiment of FIG. 10 the light coupling element is a grating 202. In the embodiment of FIG. 11 the light coupling element is a beamsplitter 203. In the embodiment of FIG. 12 the light coupling element is a surface relief grating 204. In the embodiment of FIG. 13 the light coupling element is a switchable grating array 205 containing switchable elements such as 206. In the embodiment of FIG. 10 the light coupling element is a gradient index material 207 providing curved ray paths 1092. In each case the light coupling elements provides light paths into the optical wave guide that are at angles design to provide high efficiency coupling with the waveguide grating. In other words the ray angles fall within the diffraction efficiency angular bandwidth of the waveguide grating (which condition is often referred to as being on-Bragg).

The embodiments of FIG. 1-6 may be used to transmit image light from a microdisplay to the eyebox of a display. In the case of waveguide displays the input light is modulated with temporally-varying angularly-distributed information content using a spatial light modulator such as a liquid crystal display panel or using a laser scanner based on MEMs or other beam deflection technology. Embodiments similar to those of FIG. 1-6 may be used to provide an illuminator. The embodiments of FIG. 1-6, with rays reversed, may be used to illustrate a further embodiment in which the optical waveguide grating is operative to extract light propagating therethrough out of the optical waveguide or a grating operative to couple-in light from outside the optical waveguide. Such an embodiment may be used in a sensor such as an eye tracker or LIDAR system. The grating coupler would become an output coupler for directing signal light onto a detector. The benefit of the present invention is that the range of detection handles can be expanded to address the full angular capability of a waveguide. With regard to eye tracking the invention may be used in the waveguide eye trackers disclosed in PCT/GB2014/000197 entitled HOLOGRAPHIC WAVEGUIDE EYE TRACKER, U.S. Provisional Patent Application No. 62/071,534 entitled HOLOGRAPHIC WAVEGUIDE FOR TRACKING AN OBJECT IN 3D SPACE, PCT/GB2013/000210 entitled APPARATUS FOR EYE TRACKING, PCT Application No.:GB2013/000210 entitled APPARATUS FOR EYE TRACKING.

It should be emphasized that the drawings are exemplary and that the dimensions have been exaggerated. For example, thicknesses of the SBG layers have been greatly exaggerated. Optical devices based on any of the above-described embodiments may be implemented using plastic substrates using the materials and processes disclosed in PCT Application No.: PCT/GB2012/000680, entitled IMPROVEMENTS TO HOLOGRAPHIC POLYMER DISPERSED LIQUID CRYSTAL MATERIALS AND DEVICES.

It should be understood by those skilled in the art that while the present invention has been described with reference to exemplary embodiments, it is to be understood that the invention is not limited to the disclosed exemplary embodiments. Various modifications, combinations, sub-combinations and alterations may occur depending on design requirements and other factors insofar as they are within the scope of the appended claims or the equivalents thereof.

What is claimed is:

1. A waveguide apparatus comprising:
 a light guide device comprising a light pipe having a set of one or more reflecting surfaces disposed around an optical axis configured to guide light from a first end along a spiral-like total internal reflection path therethrough to a second end such that the light is expanded along a first direction parallel to said optical axis;
a fold grating in optical contact with an elongate portion of at least one reflecting surface of the set of said reflecting surfaces;
an optical waveguide defining a plane in optical contact with said fold grating; and
a coupling grating in optical contact with said light pipe to couple incident light into said light pipe, said coupling grating having a non zero degree grating vector angle with respect to said optical axis such that incident light is coupled into said light pipe along a spiral-like total internal reflection path around said optical axis by said coupling grating,
wherein said coupling grating is configured such that said light spiraling within said light pipe is on-Bragg with said fold grating, and
wherein said fold grating is tilted around an axis perpendicular to the plane of said optical waveguide such that it is configured to extract at least a portion of said light guided through said light pipe along the at least one reflecting surface in optical contact with said folding grating such that the extracted light is coupled into said optical waveguide and directs said extracted light principally in a direction orthogonal to the first direction along a path of total internal reflection within said optical waveguide.

2. The apparatus of claim 1, wherein said fold grating is configured to extract light uniformly along an output edge of said fold grating while limiting the amount of light emerging from a side edge of said fold grating.

3. The apparatus of claim 1, wherein said reflecting surfaces comprises abutting elongate elements mutually inclined at a common angle, wherein at least one said elongate element in optical contact with said fold grating such that the elongated reflecting surfaces remain equidistant from the optical axis of the light pipe.

4. The apparatus of claim 1 further comprising, disposed along the optical path between said light pipe and optical waveguide, at least one element selected from the group of a beam splitter, an evanescent coupling optical medium and a gradient index optical medium.

5. The apparatus of claim 1, wherein said fold grating is a surface relief grating.

6. The apparatus of claim 1, wherein said fold grating couples light characterized by at least one optical characteristic selected from the group of angular range, wavelength range or polarization state.

7. The apparatus of claim 1, wherein said fold grating is selected from the group consisting of a Bragg grating, a switchable Bragg grating or an array of selectively switchable elements, and is recorded to provide a grating selected from the group consisting of a HPDLC grating, uniform modulation grating or reverse mode HPDLC grating.

8. The apparatus of claim 1, wherein said fold grating has at least one characteristic selected from the group of spatially-varying thickness, spatially-varying diffraction efficiency, or spatially-varying k-vector directions.

9. The apparatus of claim 1, wherein the optical medium of said light pipe is at least one material selected from the group of air, optical refractive material or a gradient index material.

10. The apparatus of claim 1, wherein said optical waveguide contains a grating operative to one of either extract light propagating therethrough out of the optical waveguide or couple-in light from outside the optical waveguide.

11. The apparatus of claim 1, wherein said optical waveguide contains a grating having a reciprocal diffractive relationship with said coupling grating.

12. The apparatus of claim 1, wherein said light pipe coupling grating couples light modulated with temporally varying angularly distributed information content into said light pipe.

13. The apparatus of claim 1, wherein said light guide device further comprises a light pipe outcoupling grating in optical contact with said light pipe, wherein said outcoupling grating couples data modulated light out of said light pipe.

14. The apparatus of claim 1, wherein said light pipe is divided into two elongate portions by a light coupling element, and wherein said light coupling element is a beamsplitter layer.

15. The apparatus of claim 1, wherein said light pipe is curved.

16. A waveguide apparatus comprising:
a light guide device comprising a light pipe having a set of one or more reflecting surfaces disposed around an optical axis configured to guide light from a first end along a spiral-like total internal reflection path therethrough to a second end such that the light is expanded along a first direction parallel to said optical axis;
a fold grating in optical contact with an elongate portion of at least one reflecting surface of the set of said reflecting surfaces; and
an optical waveguide defining a plane in optical contact with said fold grating,
wherein said fold grating is tilted around an axis perpendicular to the plane of said optical waveguide such that it is configured to extract at least a portion of said light guided through said light pipe along the at least one reflecting surface in optical contact with said folding grating such that the extracted light is coupled into said optical waveguide and directs said extracted light principally in a direction orthogonal to the first direction along a path of total internal reflection within said optical waveguide, and
wherein said reflecting surface comprises abutting mutually inclined elongate elements, at least one said elongate element in optical contact with said fold grating.

17. A waveguide apparatus comprising:
a light guide device comprising a light pipe having a set of one or more reflecting surfaces disposed around an optical axis configured to guide light from a first end along a spiral-like total internal reflection path therethrough to a second end such that the light is expanded along a first direction parallel to said optical axis;
a fold grating in optical contact with an elongate portion of at least one reflecting surface of the set of said reflecting surfaces; and
an optical waveguide defining a plane in optical contact with said fold grating,
wherein said fold grating is tilted around an axis perpendicular to the plane of said optical waveguide such that it is configured to extract at least a portion of said light guided through said light pipe along the at least one reflecting surface in optical contact with said folding grating such that the extracted light is coupled into said optical waveguide and directs said extracted light principally in a direction orthogonal to the first direction along a path of total internal reflection within said optical waveguide, and wherein said fold grating comprises at least two multiplexed gratings.

\* \* \* \* \*